UNITED STATES PATENT OFFICE.

WALTER H. DICKERSON, OF MUSKEGON, MICHIGAN, ASSIGNOR, BY MESNE ASSIGNMENTS, TO EDWARD J. KOEHLER.

PROCESS OF TREATING WASTE SULFITE LIQUOR AND COMPOUND OBTAINED THEREFROM.

1,394,151. Specification of Letters Patent. Patented Oct. 18, 1921.

No Drawing. Original application filed March 28, 1914, Serial No. 827,948. Divided and this application filed April 7, 1915. Serial No. 19,779.

*To all whom it may concern:*

Be it known that I, WALTER H. DICKERSON, a citizen of the United States, and a resident of Muskegon, in the county of Muskegon and State of Michigan, have invented certain new and useful Improvements in the Processes of Treating Waste Sulfite Liquor and Compound Obtained Therefrom, of which the following is a specification.

My invention relates to compositions of matter and the method of making the same; and it comprises a composition containing organic matters of waste sulfite liquor, and the process of preparing the same.

My improved process comprises the treatment of waste sulfite liquor, either in its raw or treated state.

I have discovered that by treating waste sulfite liquors, or products obtained therefrom, with suitable hydrogen compounds to produce altered organic constituents of the waste sulfite liquors, I can produce new compounds of great utility in the arts, such compounds being susceptible for such uses for example as tanning extracts, adhesive compounds or binders having highly desirable characteristics.

In the practical application of my invention, I use as the raw material, waste sulfite liquor, preferably soon after it is received from the digesters in the manufacture of paper pulp by the sulfite process. However, instead of such raw, waste sulfite liquor, which is acid, I may use neutralized, alkaline or other treated liquors, but I prefer to use unaltered, acid, waste sulfite liquors as the raw material. In treating such raw materials to produce my improved product, in practical operation I employ preferably sulfureted hydrogen gas.

In using waste sulfite liquor as it comes from the digesters, it is first cooled down, preferably by blowing into a vacuum, thus ridding the liquor of as much free sulfur dioxid as possible. Of course, this treatment with sulfureted hydrogen gas may be effected after the liquors have been concentrated somewhat if desired.

The treatment is effected by blowing the gas through the liquor, or in any other suitable manner customary in such treatments, and should be continued for eight to ten hours, or until the liquor shows a heavy precipitation of sulfur which does not further increase. It will be observed, soon after treatment is started, that the liquor becomes cloudy, which is due to the precipitation of sulfur in the solid form. This sulfur, analyses indicate, is derived both from the sulfureted hydrogen and the sulfite compounds of the waste sulfite liquor. This precipitated sulfur should be eventually removed by filtration or by decantation after settling.

Subsequent to such treatment of the waste sulfite liquor I find it preferable to add thereto reagents such as oxalic acid, ammonium sulfate, aluminum sulfate, or other sulfates which will precipitate the calcium from the liquor and liberate tanning agents for example. I may also add lactic acid or acetic acid or other organic acids, which do not precipitate calcium but which seem to increase the tanning effect of the resulting product. In some cases I may even add very dilute inorganic acids, such as sulfuric acid, to precipitate the lime.

When the finished product is to be used for bleaching purposes, for which it is very suitable, I find that it is well to add bisulfate of soda, which increases its bleaching properties. When any precipitate of calcium oxalate or calcium sulfate, etc., resulting from these or similar treatments has settled, the resulting liquor may be decanted off and may then be concentrated to any desired degree suitable for the purpose, or even to dryness.

I prefer to carry out my previously described treatment of the liquor before it has been so treated for the removal of calcium or before it has been concentrated but the order of these steps may be reversed or otherwise changed if it is desired. Thus the liquors may first be concentrated after they come from the digesters, then freed from calcium by addition of oxalic acid, and then finally treated with sulfureted hydrogen. If the liquors are concentrated before this treatment it will be found necessary to use a filter press to free the finished product from the precipitated calcium salts, or sulfur, or both.

Treatment of waste sulfite liquors as hereinbefore described produces a novel product which has improved and valuable properties when used, for tanning extracts, for example. In the first place, it gives an increased, available tanning content to the tanning extract, as compared with that obtained ordinarily from waste sulfite liquors, and as is shown by the hide powder method of analysis. The hide powder method of analysis gives a perfectly clear and water-white non-tan filtrate, something which I believe it has never been possible to hitherto obtain with any sulfite liquor tanning extract. Moreover, leather tanned by extracts prepared as described herein, dries out much softer and without the hard and tinny feeling characteristic of leather tanned in waste sulfite liquor extracts hitherto produced. My tanning extracts have a lower sulfur content and are much more fluid in character than otherwise.

When aluminum sulfate or sodium sulfate are used in preparing my new tanning extract, the mixture of this extract with ordinary quebracho extract is not soluble in cold water. Dilution of the mixture will generally increase the proportion of the reds or insolubles above that ordinarily contained in such extracts as quebracho, for example. This property of reacting upon other tanning extracts in this manner is developed to a much higher degree in my extract than in extracts prepared by any other process from waste sulfite liquors. The advantage of these characteristics of my improved waste sulfite liquor will be readily appreciated by those skilled in the art. For example, my new tanning extract, treated with aluminum sulfate, for the purpose of removing calcium or a mixture of the same with ordinary quebracho extract, is particularly useful in the finishing treatments of sole leather tanning, in which the tanned sides are put in drums with a suitable amount of hot extract and rotated for the purpose of weighting and coloring the leather. When my new extract, alone or blended with quebracho, is used for such a purpose the extract does not bleed out in the subsequent washing and bleaching baths as do other extracts, but develops a large amount of insolubles which clog up the pores of the leather, preventing anything but surface bleeding, giving a good color and weight to the finished leather.

My present application is a division of my prior application, Serial No. 827,948, filed March 28, 1914, and in which I specifically claim the treatment of waste sulfite liquor with sulfureted hydrogen for the production of tanning extracts, and in which I also claim the subsequent treatment of such extracts with oxalic acid to produce extracts capable of dissolving the insolubles of quebracho extract.

In this application I claim:

1. The process of preparing tanning extracts from waste sulfite liquor which includes treating it with sulfureted hydrogen and adding aluminum sulfate thereto.

2. The process of preparing blended tanning extracts from waste sulfite liquor which includes treating it with sulfureted hydrogen, adding aluminum sulfate thereto, and mixing it with quebracho extract.

3. The process of increasing the insolubles of tanning extracts which includes treating waste sulfite liquor with sulfureted hydrogen gas, adding aluminum sulfate thereto and mixing it with a tanning extract.

4. As a new composition of matter, a solution of the organic constituents of waste sulfite liquor which is capable of increasing the insolubles of quebracho tanning extracts.

5. The process of preparing tanning extracts from waste sulfite liquor which includes treating it with sulfureted hydrogen, adding aluminum sulfate thereto and adding an acid.

6. The process of preparing tanning extracts from waste sulfite liquor which includes treating it with sulfureted hydrogen, adding aluminum sulfate thereto and adding an organic acid.

Signed at Muskegon, in the county of Muskegon and State of Michigan, this twenty-fourth day of March, A. D. 1915.

WALTER H. DICKERSON.

Witnesses:
 GEO. H. TOUSEY,
 E. J. VARGOOD.